(12) United States Patent
Ma et al.

(10) Patent No.: US 11,600,423 B2
(45) Date of Patent: Mar. 7, 2023

(54) TRANSFORMER

(71) Applicant: Delta Electronics, Inc., Taoyuan (CN)

(72) Inventors: Peng Ma, Taoyuan (CN); Yicong Xie, Taoyuan (CN); Lin Lan, Taoyuan (CN); Weiqiang Zhang, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 924 days.

(21) Appl. No.: 16/403,697

(22) Filed: May 6, 2019

(65) Prior Publication Data

US 2020/0005984 A1 Jan. 2, 2020

(30) Foreign Application Priority Data

Jun. 27, 2018 (CN) .......................... 201810682516.7

(51) Int. Cl.
*H01F 38/20* (2006.01)
*H01F 27/24* (2006.01)
*H01F 27/28* (2006.01)
*H01F 27/32* (2006.01)

(52) U.S. Cl.
CPC ......... *H01F 27/24* (2013.01); *H01F 27/2823* (2013.01); *H01F 27/32* (2013.01)

(58) Field of Classification Search
CPC .................................................. H01F 27/2823
USPC ................................................. 336/173–175
See application file for complete search history.

(56) References Cited

U.S. PATENT DOCUMENTS

| | | | | |
|---|---|---|---|---|
| 2,251,373 A | | 8/1941 | Olsson | |
| 5,060,299 A | * | 10/1991 | Enderson | H03D 7/1408 |
| | | | | 455/330 |
| 5,376,912 A | * | 12/1994 | Casagrande | H01F 27/16 |
| | | | | 336/212 |
| 5,477,011 A | * | 12/1995 | Singles | H01B 11/1066 |
| | | | | 174/109 |
| 7,714,683 B2 | * | 5/2010 | Takahashi | H01F 17/062 |
| | | | | 336/229 |

(Continued)

FOREIGN PATENT DOCUMENTS

| | | |
|---|---|---|
| CN | 1225755 A | 8/1999 |
| CN | 2473721 Y | 1/2002 |

(Continued)

OTHER PUBLICATIONS

The 1st Office Action dated Jan. 26, 2021 by the CNIPA.

(Continued)

*Primary Examiner* — Ronald Hinson
(74) *Attorney, Agent, or Firm* — Qinghong Xu

(57) ABSTRACT

The present disclosure provides a transformer including at least one magnetic core each having at least one window; one primary side winding passing through the at least one window, a wire forming the primary side winding being sequentially covered with a first solid insulating layer, a grounded shielding layer and a second solid insulating layer from inside to outside along a radial direction of the wire, the grounded shielding layer being connected to a reference ground; and at least one secondary side winding, each passing through the at least one window, the primary side winding having a first voltage with respect to the reference ground, the secondary side winding having a second voltage with respect to the reference ground, and the second voltage being greater than 50 times of the first voltage.

10 Claims, 13 Drawing Sheets

(56) References Cited

U.S. PATENT DOCUMENTS

| | | | |
|---|---|---|---|
| 10,373,755 B2* | 8/2019 | Prager | H01F 30/16 |
| 2004/0084987 A1 | 5/2004 | Leijon | |
| 2004/0089468 A1 | 5/2004 | Carstensen | |
| 2004/0119577 A1* | 6/2004 | Weger | H01F 30/16 |
| | | | 336/229 |
| 2011/0048765 A1* | 3/2011 | Eggertsen | H01B 7/14 |
| | | | 156/244.11 |

FOREIGN PATENT DOCUMENTS

| | | |
|---|---|---|
| CN | 1885044 A | 12/2006 |
| CN | 202307285 U | 7/2012 |
| CN | 202678029 U | 1/2013 |
| CN | 202906761 U | 4/2013 |
| GB | 833364 A | 4/1960 |
| GB | 2536931 A | 10/2016 |

OTHER PUBLICATIONS

The EESR issued Nov. 28, 2019 by the EPO.
The 2nd Office Action dated Oct. 18, 2021 for CN patent application No. 201810682516.7.

* cited by examiner

TRANSFORMER

CROSS REFERENCE

This application is based upon and claims priority to Chinese Patent Application No. 201810682516.7, filed on Jun. 27, 2018, the entire contents thereof are incorporated herein by reference.

TECHNICAL FIELD

The present disclosure relates to an electric element, and particularly to a transformer.

BACKGROUND

In recent years, as the amount of data explosively is increasing, the value of data is suddenly rising and the cloud computation is rapidly developing, the number of the data centers keeps growing at a high-speed in both of global market and Chinese market. The market value, electricity consumption and the like of the data centers all reflect a development trend of the data centers and the importance thereof. On the other hand, driven by both of policy and market, the production and marketing of new-enemy vehicles continuously increase. An intelligent and efficient charging infrastructure system in which a. charging post is always available for a vehicle also is an important technology to be developed.

Power electronic converters, due to their advantages of high efficiency and modularization, will be more and more widely used in the future for supplying power to the data centers and the charging posts. An auxiliary power supply is a very important component of a power electronic converter. In tradition, an auxiliary power supply would take electric power from a module, and is generally required to supply power to the module. The number of auxiliary power supplies have be increased or decreased in order to adaptively match the number of modules. However, such solution cannot satisfy newly increased needs in the future such as a power supply for a by-pass switch in the system during a hot-plug operation, and the system requires for an external and independent auxiliary power supply with medium voltage isolation to cope with the newly increased needs in the future.

In the tendency of constantly increased voltage application level, in order to effectively isolate a middle voltage module from the external and independent auxiliary power supply so as to ensure personal safety, it is required to design a transformer with relatively higher security isolation level. At the same time, in order to improve a power density of equipment, it is required that the isolation transformer occupies smaller space volume.

Currently, there are two solutions in designing the isolation transformer for the auxiliary power supply as follows:

1) The first solution is to form a double insulation by utilizing two-stage magnetic element isolation, which structure occupies relatively greater space volume and also affects the efficiency of the system.

FIG. 1 is a structural view of this solution. The leftmost component labeled as 103 is a safety extra-low voltage (SEL) circuit board, while the rightmost components labeled as 105 are multiple high voltage (WV) modules. Each stage of magnetic element in the middle (a first stage of magnetic element 101 and a second stage of magnetic element 102) is substantially insulated and isolated. The two stages of magnetic elements are connected in series so as to constitute a double insulation structure. Such structure is constituted by two stages of magnetic elements (the first stage of magnetic element 101 and the second stage of magnetic element 102); a primary side wire (connecting the first stage of magnetic element 101 and the second stage of magnetic element 102) is an ordinary insulated wire (the ordinary insulated wire is constituted by a conductive wire core and an insulating layer wrapping the conductive wire core); the primary side wire passes through a plurality of magnetic elements at the same time. In the first stage of magnetic element 101, a secondary side wire passes through a plurality of magnetic elements 104 at the same time; in the second stage of magnetic element 102, the secondary side wire passes through a single magnetic element 104.

The first solution is disadvantageous in that: (1) the two-stage magnetic element insulation requires a safety distance and a safety creepage distance to be reserved between stages of magnetic elements, between each stage of magnetic element and the surrounding environment (e.g., 11 and 12), as well as between the first stage of magnetic element 101 and the SELV circuit board (e.g., 13); the first stage of magnetic element 101 is formed by stacking a plurality of magnetic elements 104, which has more strict requirement on the insulation distance with respect to the case of a single magnetic element 104 and results in a relatively larger size of the magnetic element 104; (2) limited by the design of the first stage of magnetic element 101 (e.g., the consideration of heat dissipation), the number of load allowed to be connected to the second stage of magnetic element 102 in series is relatively small; as a result, in order to achieve the power supply for all the loads, the system has to be provided with a large number of SELV circuit boards 103; (3) the structure in which two stages of magnetic elements are connected in series reduces the efficiency of the transformer.

2) The second solution is to optimize the two-stage magnetic element isolation to one-stage isolation. In this solution, a combination of a grounded aluminum pipe 106 and a magnetic element is used to form structure of a grounded metallic shield plus a basic insulation. However, this solution also involves several defections.

FIG. 2 is a structural view of this solution. The leftmost component is a SELV circuit board 103, and the rightmost components are multiple HV modules 105, with only one-stage magnetic element isolation 101 between them. The grounded aluminum pipe 106 passes through a magnetic element 104 and is concentric with the magnetic element 104, and a primary wire passes through the grounded aluminum pipe 106, so as to constitute a structure of basic insulation plus grounded metallic shield.

The one-stage magnetic element isolation 101 in this solution is consisted of a plurality of magnetic elements 104. Moreover, a primary side winding passes through the plurality of magnetic elements 104, and a secondary side winding passes through a single magnetic element 104. The primary side winding passes through the grounded aluminum pipe 106 which is concentric with the magnetic elements 104, and the magnetic elements 104 and the high-voltage winding (the secondary side winding) are subjected to an embedment process.

The second solution is disadvantageous in that: (1) the embedment of the magnetic element 104 imposes restriction on a material selection of magnetic core, a stress generated by the embedment would usually result in greatly increased wear and tear of the magnetic core, and the insulation material would affect the heat dissipation property of the magnetic element 104; (2) the grounded aluminum pipe 106 is exposed to the air, which needs to take measures to allow a creepage distance between the aluminum pipe 106 and the high-voltage side to satisfy the safety requirement (as indicated by 16 in FIG. 2); at the same time, a safety distance and a creepage distance also have to be reserved between the one-stage magnetic element isolation 101 and the surrounding environment (e.g., 15); (3) it has to ensure that the aluminum 106 possesses good concentricity with multiple magnetic elements 104, which requires for relatively higher machining precision.

Thus it can be seen, it's difficult for the traditional solutions to optimize insulation coordination while miniaturizing the transformer so as to improve the electric field distribution and increase the power density of the transformer.

SUMMARY

An objective of the present disclosure is to provide a transformer so as to, at least to some extent, overcome the above-mentioned technical problems resulted by the restrictions and defections of the related technology.

Other characteristics and advantages of the present disclosure will become apparent from the detailed description as below, or will be partly learned through a practice of the present disclosure.

According to a first aspect of the present disclosure, a transformer is provided. The transformer includes: at least one magnetic core, each having at least one window; one primary side winding passing through the at least one window of each magnetic core, a wire forming the primary side winding being covered with a first solid insulating layer, a grounded shielding layer and a second solid insulating layer, sequentially, from inside to outside, along a radial direction of the wire, the grounded shielding layer being connected to a reference ground; and at least one secondary side winding, each passing through the at least one window of one corresponding magnetic core, the primary side winding having a first voltage with respect to the reference ground, the secondary side winding having a second voltage with respect to the reference ground, and the second voltage being greater than 50 times of the first voltage.

Optionally, the number of the magnetic core is at least two.

Optionally, the magnetic core is a circular-shaped magnetic ring.

Optionally, the magnetic core is an oval-shaped, polygon-shaped or irregular-shaped magnetic ring.

Optionally, the magnetic core is a combined magnetic core having an EE shape, an EI shape, a UU shape, a UI shape, a CC shape or a CI shape.

Optionally, a peripheral surface of the magnetic ring is attached with a conductive foil layer which is electrically connected to an end of the secondary side winding.

Optionally, the conductive foil layer is a copper foil layer.

Optionally, given that an external radius of the grounded shielding layer is r, an internal radius of the magnetic ring is R, a dielectric constant of the second solid insulating layer is ε, and the second voltage is U, then a thickness d of the second solid insulating layer satisfies formulas as below:

$$\frac{1.2 * U}{r\varepsilon\left(\frac{1}{\varepsilon}\ln\left(\frac{r+d}{r}\right)+\ln\left(\frac{R}{e+d}\right)\right)} \leq 20 \text{ kV/mm, and}$$

$$\frac{1.2 * U}{(r+d)\left(\frac{1}{\varepsilon}\ln\left(\frac{r+d}{r}\right)+\ln\left(\frac{R}{e+d}\right)\right)} \leq 2 \text{ kV/mm.}$$

Optionally, a space between the grounded shielding layer and the second solid insulating layer is further covered with a semi-conductive layer.

Optionally, the semi-conductive layer is of a polymer material doped with carbon black.

Optionally, the polymer material doped with carbon black is ethylene-vinyl acetate copolymer doped with carbon black or polyethylene doped with carbon black, having a resistivity in the range of $10^{-4} \sim 10^3$ Ω·m.

Optionally, the first solid insulating layer and the second solid insulating layer both are of silicone rubber, polyethylene, polyurethane, polytetrafluoroethylene, polyvinyl chloride, polypropylene or ethylene-propylene rubber.

The transformer provided by the present disclosure is advantageous in that:

(1) it's only provided with one-stage insulated isolation, which occupies smaller space volume;

(2) it eliminates the embedment process of the grounded aluminum pipe and the secondary side winding, which ensures good heat dissipation property;

(3) the primary side winding is of high-voltage insulated wire, which has no need of considering the safety standard distance from the primary side winding to the high-voltage side;

(4) the insulated structure of the primary side winding allows the electric field distribution to be uniform and improves the voltage of local discharging, thereby increasing the power density of the transformer.

In order to understand the features and technical contents of the present disclosure further, reference may be made to the detailed description below in connection with the present disclosure and the accompanying drawings. However, the detailed description and the accompanying drawings herein are merely for explaining the present disclosure without constituting any limitation to the scope of the claims of the present disclosure.

BRIEF DESCRIPTION OF THE DRAWINGS

The above and other features and advantages of the present disclosure will be more obvious from the detailed description of the illustrative embodiments with reference to the drawings.

Figure 1:
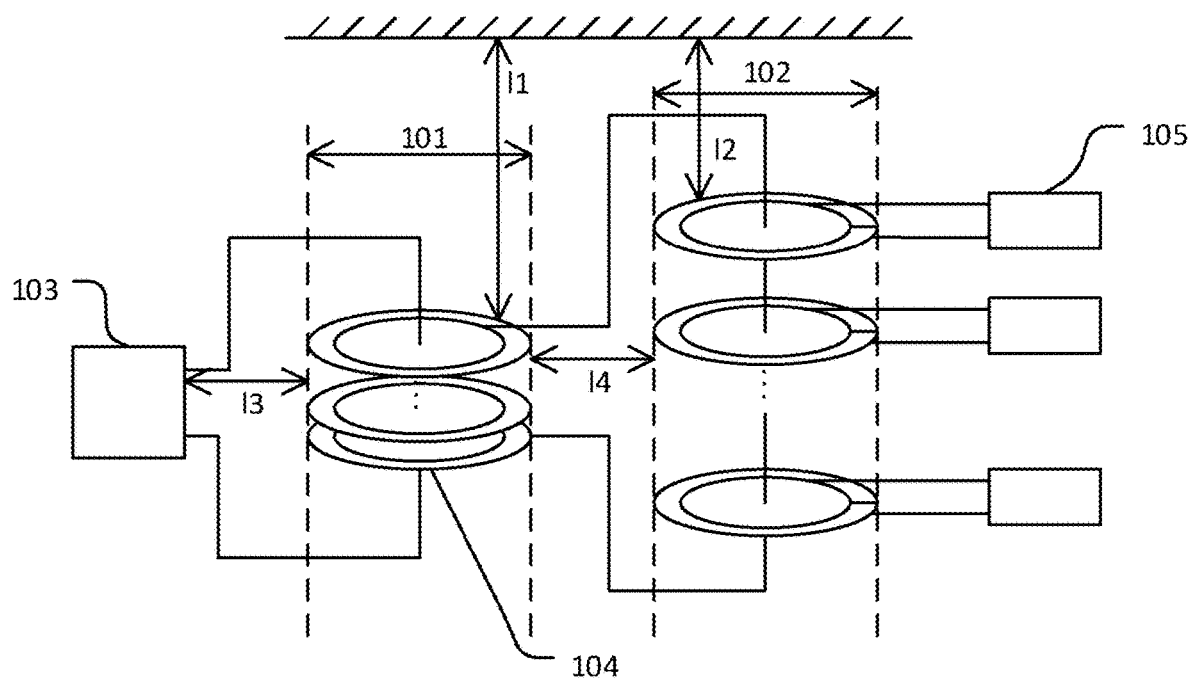
FIG. 1 is a schematic diagram of a transformer according to existing technology.

REFERENCE NUMERALS 101-first stage of magnetic element; 102-second stage of magnetic element; 103-SELV circuit board; 104-magnetic element; 105-HV module; 106-grounded aluminum tube; 1-wire core; 2-first solid insulating layer; 3-grounded shielding layer; 4-second solid insulating layer; 5,5A, 5B-air; 6-magnetic core; 7, 8-secondary side winding; 9, 23-insulated wire of primary side winding; 10, 13, 16-magnetic core; 11, 14, 17-magnetic element framework; 12, 15, 18-HV module; 21, 22-EE magnetic core; 25-semi-conductive layer; 26-conductive foil layer; A-window.

DETAILED DESCRIPTION

Exemplary embodiments of the present disclosure now will be described in a more complete way with reference to the drawings. However, the exemplary embodiments of the present disclosure may be implemented in various ways, and should not be interpreted as being limited to the exemplary embodiments herein; on the contrary, these embodiments are provided so that the present disclosure can be comprehensive and complete, and also the concepts of these exemplary embodiments can be fully conveyed to those skilled in the art. In the drawings, the same reference signs indicate identical or similar structures, and hence detailed explanation thereof will be omitted.

Additionally, described feature(s), structure(s) or characteristic(s) may be combined in one or more embodiment in any appropriate way. In the description below, plenty of details will be provided so that the embodiments of the present disclosure are fully understandable. However, those skilled in the art will be appreciated that, technical solution(s) of the present disclosure may be implemented without one or more of these specific details, or other structure(s), component(s), step(s), method(s) and the like may be adopted. Under other circumstances, well-known structure(s), component(s) or operation(s) will not be illustrated or described in details, so as not to obscure various aspects of the present disclosure.

Figure 3:
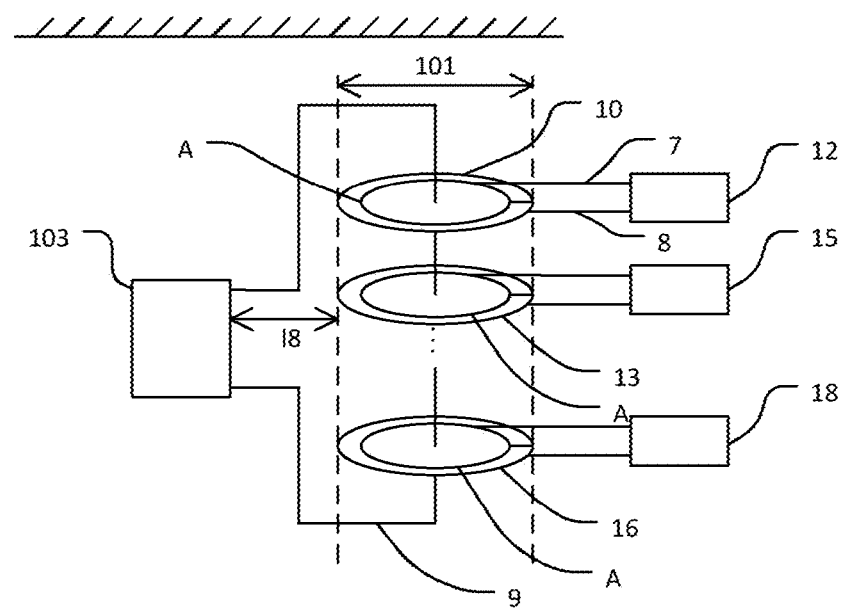
FIG. 3 is a schematic diagram of a transformer according to an embodiment of the present disclosure.

First of all, referring to FIG. 3 which is a schematic diagram of a transformer according to an embodiment of the present disclosure.

The transformer includes at least one magnetic core (e.g., 10, 13, 16), one primary side winding 9 and at least one secondary side winding.

In some embodiments of the present disclosure, the number of the magnetic core is at least two. As illustrated in FIG. 3, total three magnetic cores 10, 13 and 16 are illustrated in the present embodiment. These magnetic cores are each provided with a window A. In the present embodiment, each of the magnetic cores 10, 13 and 16 has a window A and is a circular-shaped magnetic ring. In some other embodiments of the present disclosure, each of the magnetic cores is an oval-shaped, polygon-shaped or irregular-shaped magnetic ring provided with one window, without limiting the present disclosure thereto.

The primary side winding passes through the at least one window A of each of all the magnetic cores 10, 13 and 16. An insulated wire 9 constituting the primary side winding is sequentially covered with a first solid insulating layer (labeled as "2" in FIG. 5), a grounded shielding layer (labeled as "3" in FIG. 5) and a second solid insulating layer (labeled as "4" in FIG. 5) from inside to outside, along a radial direction of the insulated wire 9. The grounded shielding layer is connected to a reference ground. The first solid insulating layer and the second solid insulating layer may be of silicone rubber, polyethylene, polyurethane, polytetrafluoroethylene, polyvinyl chloride, polypropylene or ethylene-propylene rubber, without limiting the present disclosure thereto.

Each of the secondary side wiring 7, 8 (reference signs 7 and 8 are labeled at two ends of one of the secondary side windings) passes through at least one window A of one of the corresponding magnetic cores 10, 13, 16.

The primary side winding 9 has a first voltage with respect to the reference ground, and the secondary side windings 7, 8 each has a second voltage with respect to the reference ground. The second voltage is greater than 50 times of the first voltage.

Figure 4:
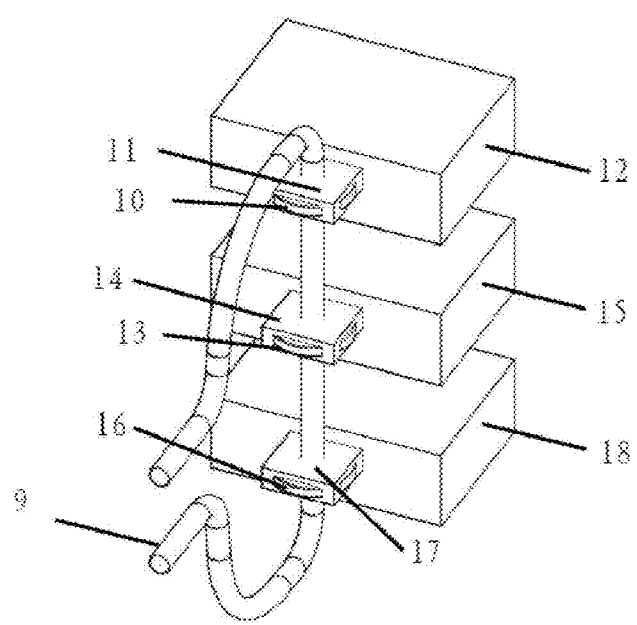
FIG. 4 is a perspective diagram of the transformer illustrated in FIG. 3.

Specifically, referring to FIG. 4 which is a perspective diagram of the transformer in FIG. 3.

The transformer includes at least one magnetic core (e.g., 10, 13, and 16), one primary side winding, at least one secondary side winding (not illustrated) and at least one HV module (in the present embodiment, one HV module corresponds to one magnetic core, without limiting the present disclosure thereto). The magnetic core 10 (exemplarily shown as a magnetic ring) is fixed in a magnetic element framework 11. An insulated wire 9 (the structure of the insulated wire 9 is as same as that shown by the cross-sectional view in FIG. 4) of the primary side winding with in-band shielding, the window of the magnetic core 10, and the magnetic element framework 11 are presented as concentric structures. The magnetic core 13 and the magnetic core 16 have a connecting structure which is as same as that of the magnetic core 10. The insulated wire 9 of the primary side winding may pass through a plurality of magnetic cores (magnetic cores 10, 13 and 16) and a plurality of magnetic element frameworks (magnetic element frameworks 11, 14 and 17). The magnetic element frameworks 11, 14 and 17 are respectively fixed at one side of the HV modules 12, 15 and 18.

FIG. 4 illustrates a specific implementation of the transformer. The magnetic cores (magnetic cores 10, 13 and 16), the insulated wire 9 of the primary side winding, the secondary side windings and the HV modules are connected together by the magnetic element frameworks (magnetic element frameworks 11, 14 and 17), so as to improve transmission efficiency and to uniform distribution of the electric field of the insulated structure.

Figure 5:
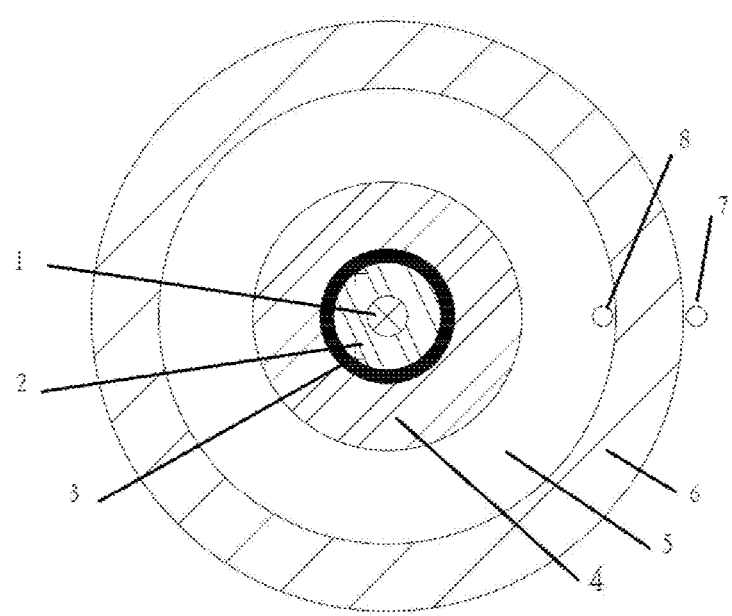
FIG. 5 is a cross-sectional view illustrating a primary side winding passing through a magnetic core, according to an embodiment of the present disclosure.

Particularly, as illustrated in FIG. 5 which is a cross-sectional view of a primary side winding and a secondary side winding passing through a magnetic core. In the cross-sectional view of FIG. 5, a wire core 1 of an insulated wire of a primary side winding, a first solid insulating layer 2, a grounded shielding layer 3, a second solid insulating layer 4, the air 5, a magnetic core 6 (e.g., the magnetic core 6 may be any one of the magnetic cores 10, 13 and 16 as illustrated in FIG. 3) and secondary side windings 7, 8 are sequentially provided from inside to outside along a radial direction. The first solid insulating layer 2 has to withstand a voltage of the wire core 1 of the insulated wire of the primary side winding to the grounded shielding layer 3, and the second solid insulating layer 4 has to withstand a voltage of the secondary side windings 7, 8 to the grounded shielding layer 3.

Figure 6:
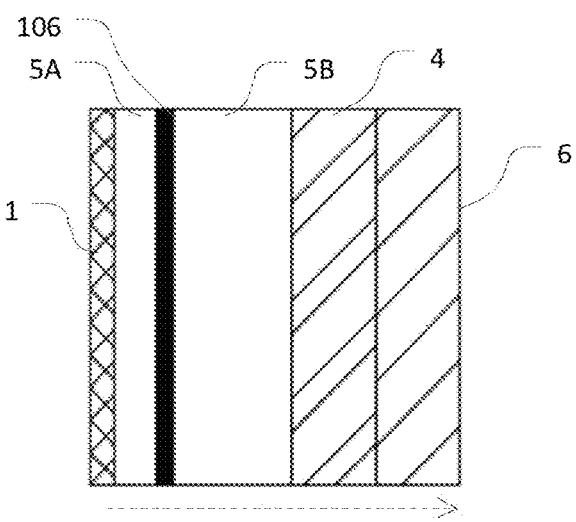
FIG. 6 is a structural diagram illustrating an insulated structure in which a primary side winding passes through a magnetic core as illustrated in FIG. 2.
Figure 7:
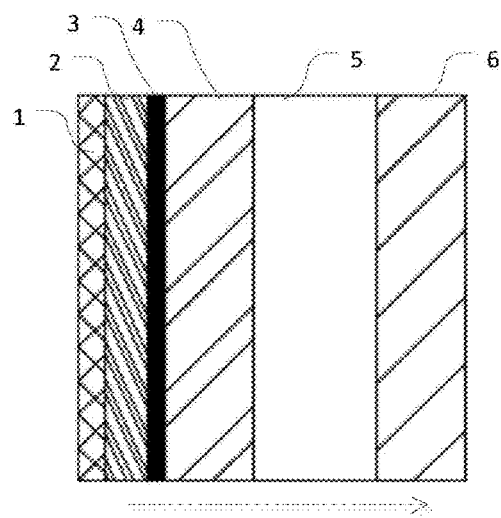
FIG. 7 is a structural diagram illustrating an insulated structure in which a primary side winding passes through a magnetic core as illustrated in FIG. 3.

Hereinafter, the embodiment of the present disclosure will be compared with the second solution in the existing technology by referring to FIGS. 6 and 7. FIG. 6 is a structural diagram illustrating insulated structure in which a primary side winding passes through a magnetic core as illustrated in FIG. 2, and FIG. 7 is a structural diagram illustrating an insulated structure in which a primary side winding passes through a magnetic core as illustrated in FIG. 3.

Figure 2:
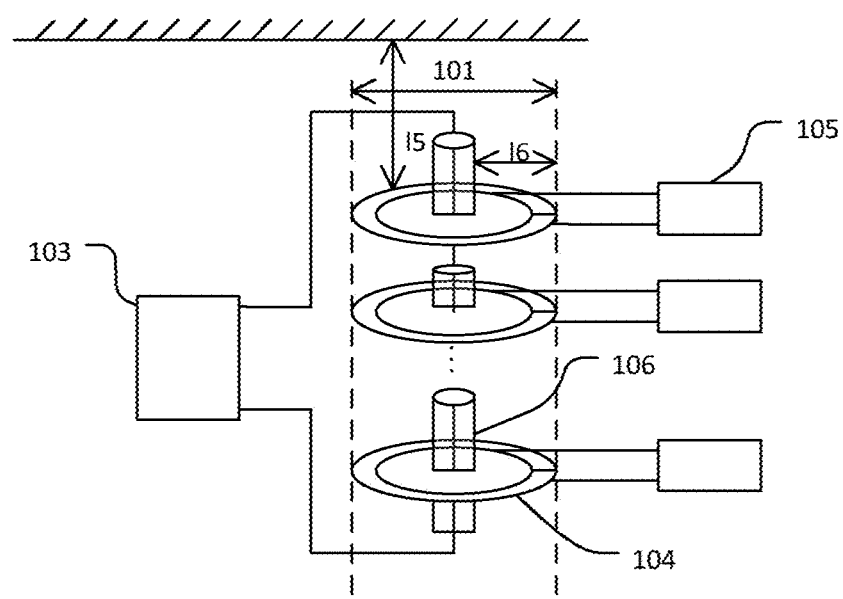
FIG. 2 is a schematic diagram of another transformer according to existing technology.

In the second solution of the existing technology (as illustrated in FIG. 2), the insulated structure with a primary side winding passing through a magnetic core includes, sequentially from inside to outside, a wire core 1 of a primary side winding, the air 5A, a grounded aluminum pipe 106, the air 5B, a solid insulating layer 4 and a magnetic core 6. In the embodiment of the present disclosure, the insulated structure with a primary side winding passing through a magnetic core includes, sequentially from inside to outside, a wire core 1 of a primary side winding, a first solid insulating layer 2, a grounded metallic shield 3, a second solid insulating layer 4, the air 5 and a magnetic core 6. Compared with the second solution of the existing technology, the embodiment of the present disclosure illustrated in FIG. 5 replaces the air 5A with the first solid insulating layer 2; meanwhile, the position of the air 5B is exchanged with the position of the second solid insulating layer 4. The variation of the insulated structure causes a corresponding change in electric field distribution.

Figure 8:
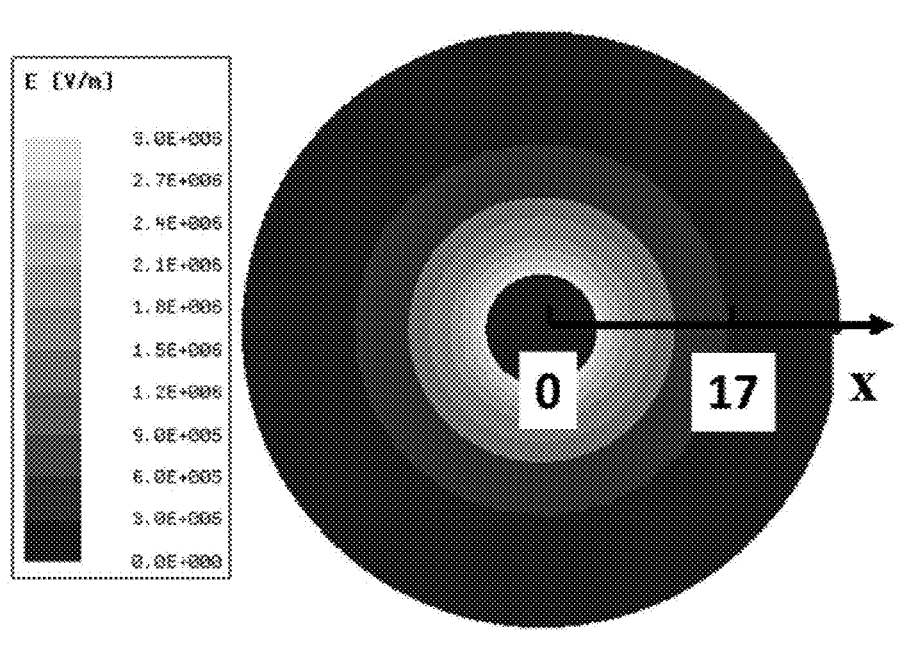
FIG. 8 is an electric field distribution diagram of the insulated structure illustrated in FIG. 6.
Figure 9:
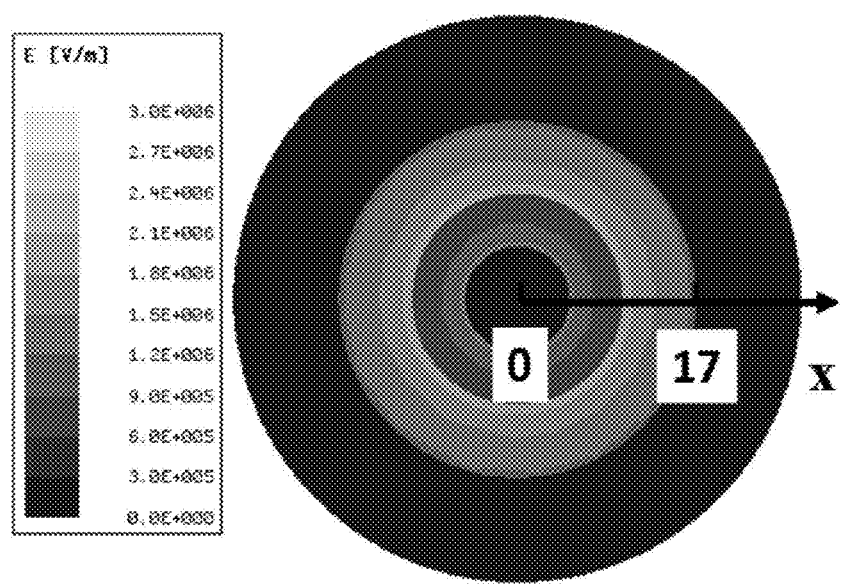
FIG. 9 is an electric field distribution diagram of the insulated structure illustrated in FIG. 7.

Given that an external radius of the grounded shielding layer 3 (or the grounded aluminum pipe 106) is 5 mm, a thickness of the second solid insulating layer 4 is 5 mm, an internal radius of the magnetic ring 6 is 17 mm, a dielectric constant $\varepsilon_r$ of the first solid insulating layer and the second solid insulating layer is 3, and an applied voltage is 15 kV, the electric field distribution corresponding to the second solution in the exiting technology and the electric filed distribution corresponding to the embodiment of the present disclosure are illustrated in FIGS. 8 and 9, respectively. FIG. 8 is an electric field distribution diagram of the insulated structure illustrated in FIG. 6, and FIG. 9 is an electric field distribution diagram of the insulated structure illustrated in FIG. 7. The X-axis direction in FIGS. 8 and 9 is a radial direction from the insulated structure, and a value in the X-axis is a distance from a center of the insulated structure. Different shades indicate different electric field intensities.

Figure 10:
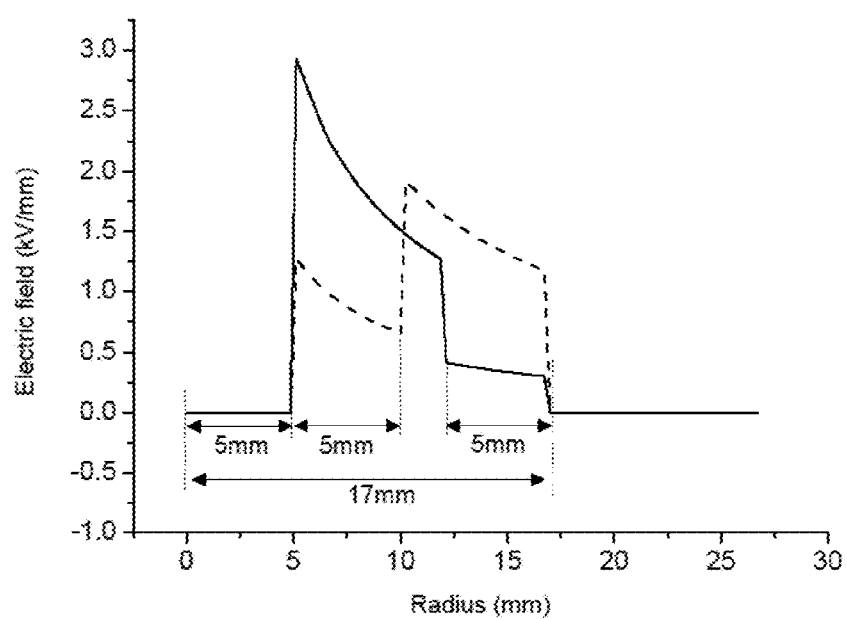
FIG. 10 is a comparison diagram illustrating the electric field distribution of the insulated structure in FIG. 6 versus the electric field distribution of the insulated structure in FIG. 7.

In order to compare the electric field distributions of the two insulated structures more intuitively, a changing curve of electric field is drafted by starting from a center of circle, along the radial direction, as illustrated in FIG. 10 (the horizontal coordinate indicates the radius while the vertical coordinate indicates the electric field intensity). The solid-line curve illustrates an electric field distribution condition of the second solution in the existing technology. It can be seen that, the insulated structure has a greater electric field value at an inner side (an external surface of the grounded aluminum pipe, at a horizontal coordinate position of 5 mm), with a maximum value of 2.9 kV/mm, and the insulated structure has an extremely small electric field value at an external side (smaller than 0.5 kV/mm, at a horizontal coordinate position greater than 17 mm); that is, the electric field distribution is extremely uneven. The dash-line curve illustrates the electric field distribution condition of the embodiment of the present disclosure, in which the maximum electric field is located at an interface (at a horizontal coordinate position of 12 mm) of the second solid insulating layer with the air, having a value of 1.9 kV/mm, and an inner side of the second solid insulating layer has relatively smaller electric field (the maximum value is 1.2 kV/mm, and the horizontal coordinate position is smaller than 10 mm). Compared with the second solution in the existing technology, the maximum electric field value in the present disclosure is reduced: it reduced from 2.9 kV/mm to 1.9 kV/mm; meanwhile, the entire electric field distribution is more uniform. Thus, as compared with the second solution in the existing technology, the embodiment of the present disclosure optimizes the entire insulation coordination.

In a middle-voltage insulation system of 13.8 kV, given that an electric clearance and a creepage distance specified in the safety standard is 152 min and 203 mm, respectively, then a distance (as indicated by 16 in FIG. 2) from the grounded aluminum pipe to the high-voltage side in the second solution of the existing technology is at least 152 mm; by contrast, since the primary side winding in the embodiment of the present disclosure is a high-voltage insulated wire, it has no need of considering the safety standard distance from the primary side winding to the high-voltage side; that is, the embodiment of the present disclosure is except from such restriction. As a result, for a single insulated structure in an isolation transformer, the structure provided by the present disclosure saves the occupied volume of space by ⅓, as compared with the second solution of the existing technology.

That is, the transformer provided by the embodiment of the present disclosure only adopts one-stage insulated isolation which occupies smaller volume of space; at the same time, compared to the second solution of the existing technology, the magnetic core in the embodiment of the present disclosure is not subjected to an embedment process, which ensures a good heat dissipation of the magnetic core; additionally, the primary side winding is a high-voltage insulated wire, which has no need of considering its safety standard distance from the high-voltage side. The embodiment of the present disclosure also optimizes the insulation coordination between the first side winding and the magnetic core, and hence allows the entire electric field distribution to be uniform.

In the present disclosure, a thickness d of the solid insulating layer 4 needs to satisfy certain requirements. In a specific implementation of the present disclosure, given that an external radius of the grounded shielding layer 3 is r, an internal radius of the magnetic ring 6 is R, a dielectric constant of the second solid insulating layer 4 is $\varepsilon$, and the second voltage is U, then the thickness d of the second solid insulating layer 4 needs to satisfy formulas as below:

$$\frac{1.2 * U}{r\varepsilon\left(\frac{1}{\varepsilon}\ln\left(\frac{r+d}{r}\right) + \ln\left(\frac{R}{e+d}\right)\right)} \leq 20 \text{ kV/mm, and}$$

$$\frac{1.2 * U}{(r+d)\left(\frac{1}{\varepsilon}\ln\left(\frac{r+d}{r}\right) + \ln\left(\frac{R}{e+d}\right)\right)} \leq 2 \text{ kV/mm.}$$

Figure 11:
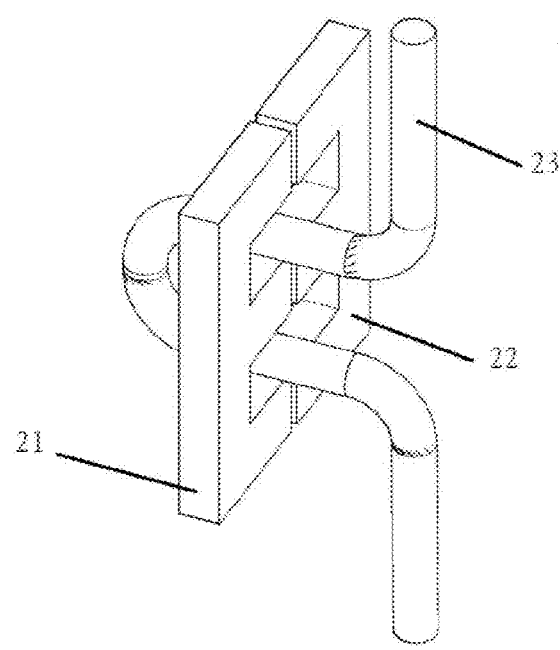
FIG. 11 is a structural diagram of an EE magnetic core according to an embodiment of the present disclosure.

FIG. 11 is a schematic diagram of a winding structure in a transformer according to an embodiment of the present disclosure in which a magnetic core of the transformer is an EE magnetic core. When the magnetic core of the transformer is an EE magnetic core, EE magnetic cores 21 and 22 together constitute two windows through which the insulated wire 23 (the insulated sire 23 has a structure the same with that in the cross-sectional view of FIG. 5) of the first side winding passes. In the present embodiment, it can prevent from a saturation of magnetic core by adjusting an air gap between the EE magnetic cores 21 and 22. The present disclosure is not limited thereto, and the magnetic core of the transformer may also be a combined magnetic core having an EI shape, a UU shape, a UI shape, a CC shape or a CI shape. In these embodiments, a saturation of magnetic core may be prevented by adjusting the air gap between the magnetic cores.

Figure 12:
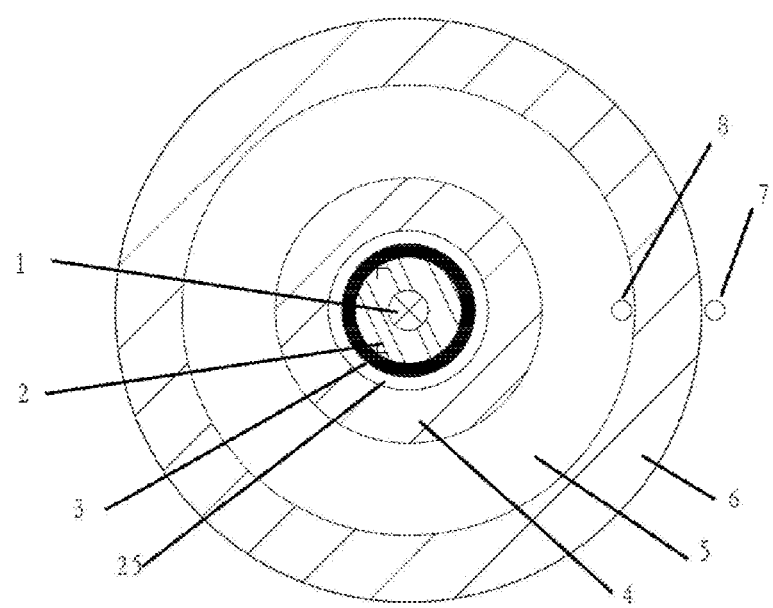
FIG. 12 is a cross-sectional view illustrating a primary side winding passing through a magnetic core, according to another embodiment of the present disclosure.

FIG. 12 is a cross-sectional view illustrating a primary side winding passing through a magnetic core, according to another embodiment of the present disclosure. The structure of FIG. 12 is similar to that illustrated in FIG. 5, i.e., a wire core 1 of an insulated wire of a primary side winding, a first solid insulating layer 2, a grounded shielding layer 3, a second solid insulating layer 4, the air 5, a magnetic core 6 (the magnetic core 6 for example may be any one of the magnetic cores 10, 13 and 16 as illustrated in FIG. 3) and a secondary side winding 7, 8 are sequentially provided from a center of inside to outside, along a radial direction. What is different from the structure illustrated in FIG. 5 is that: a space between the grounded shielding layer 3 of the insulated wire of the primary side winding and the second insulating layer 4 is covered with a layer of semi-conductive layer 25. The semi-conductive layer 25 may be of polymer material doped with carbon black by injection, such as ethylene-vinyl acetate copolymer doped with carbon black or polyethylene doped with carbon black. A resistivity of the semi-conductive layer 25 is preferably in the range of $10^{-4} \sim 10^3$ Ω·m. The semi-conductive layer 25 may further improve the local discharge level of the insulated wire of the first side winding and hence improve the reliability of the transformer.

Figure 13:
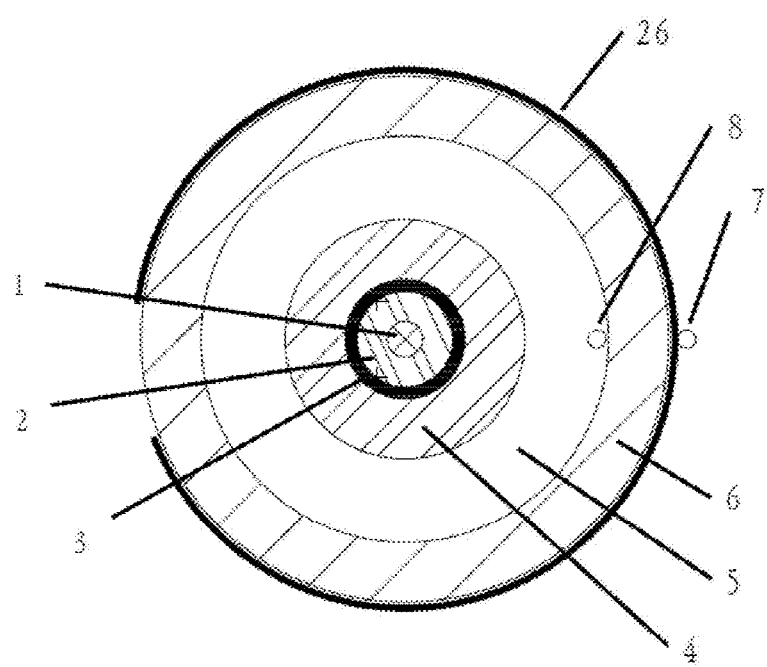
FIG. 13 is a cross-sectional view illustrating a primary side winding passing through a magnetic core, according to yet another embodiment of the present disclosure.

FIG. 13 is a cross-sectional view illustrating a primary side winding passing through a magnetic core, according to yet another embodiment of the present disclosure. The structure of FIG. 13 is similar to that illustrated in FIG. 5, i.e., a wire core 1 of an insulated wire of a primary side winding, a first solid insulating layer 2, a grounded shielding layer 3, a second solid insulating layer 4, the air 5, a magnetic core 6 (the magnetic core 6 for example may be any one of the magnetic cores 10, 13 and 16 as illustrated in FIG. 3) and a secondary side winding 7, 8 are sequentially provided from a center of inside to outside, along a radial direction. What is different from FIG. 5 is that, in the embodiment illustrated in FIG. 13, an external surface of the magnetic core 6 is attached with a conductive foil layer 26 which is electrically connected to an end of the secondary side winding. In the present embodiment, the conductive foil layer 26 is connected to an end labeled as 7 of the secondary side winding. In other embodiments, the conductive foil layer 26 may also be connected to the other end labeled as 8 of the secondary side winding. In some embodiments, the conductive foil layer 26 may be copper foil layer. The structure provided by the present embodiment can prevent from a local discharge occurred between the secondary side winding 7, 8 and the magnetic core 6, so as to improve the reliability of the transformer.

The embodiments above may be implemented individually or in combination.

Variation modes of these embodiments shall all fall within the scope of protection of the present disclosure.

The transformer provided by the present disclosure possesses the following advantages:

(1) it's only provided with one-stage insulated isolation, which occupies smaller volume in space;

(2) it eliminates the embedment process of the grounded aluminum pipe and the secondary side winding, which ensures good heat dissipation property;

(3) the primary side winding is a high-voltage insulated wire, which has no need of considering the safety standard distance from the primary side winding to the high-voltage side; and (4) the insulated structure of the primary side winding allows the electric field distribution to be uniform and improves the voltage of local discharging, thereby increasing the power density of the transformer.

Although the present disclosure has been described in terms of related embodiments above, these embodiments are merely exemplary examples of implementing the present disclosure. It should be pointed out that, the revealed embodiments are not intended to limit the scope of the present disclosure. On the contrary, any modification or decoration made without departing from the spirit and scope of the present disclosure all fall within the scope claimed by the present disclosure.

What is claimed is:

1. A transformer, comprising:
   at least one magnetic core, each having at least one window;
   one primary side winding passing through the at least one window of each of all the magnetic core; and
   at least one secondary side winding, each passing through the at least one window of one corresponding magnetic core,
   wherein a wire forms the primary side winding, and the wire is sequentially covered with a first solid insulating layer, a grounded shielding layer and a second solid insulating layer from inside to outside along a radial direction of the wire,
   wherein the grounded shielding layer is connected to a reference ground,
   wherein the primary side winding has a first voltage with respect to the reference ground, the secondary side winding has a second voltage with respect to the reference ground, and the second voltage is greater than 50 times of the first voltage;
   wherein a space between the grounded shielding layer and the second solid insulating layer is further covered with a semi-conductive layer;
   wherein the magnetic core is a circular-shaped magnetic ring; and
   wherein given that an external radius of the grounded shielding layer is r, an internal radius of the magnetic ring is R, a dielectric constant of the second solid insulating layer is ε, and the second voltage is U, then a thickness d of the second solid insulating layer satisfies formulas as below:

$$\frac{1.2 * U}{r\varepsilon\left(\frac{1}{\varepsilon}\ln\left(\frac{r+d}{r}\right) + \ln\left(\frac{R}{e+d}\right)\right)} \leq 20 \text{ kV/mm, and}$$

$$\frac{1.2 * U}{(r+d)\left(\frac{1}{\varepsilon}\ln\left(\frac{r+d}{r}\right)+\ln\left(\frac{R}{e+d}\right)\right)} \leq 2 \text{ kV/mm.}$$

2. The transformer according to claim 1, wherein a number of the magnetic core is at least two.

3. The transformer according to claim 1, wherein the magnetic core is an oval-shaped, polygon-shaped or irregular-shaped magnetic ring.

4. The transformer according to claim 1, wherein the magnetic core is a combined magnetic core having an EE shape, an EI shape, a UU shape, a UI shape, a CC shape or a CI shape.

5. The transformer according to claim 1, wherein a peripheral surface of the magnetic ring is attached with a conductive foil layer which is electrically connected to an end of the secondary side winding.

6. The transformer according to claim 5, wherein the conductive foil layer is a copper foil layer.

7. The transformer according to claim 1, wherein a space between the grounded shielding layer and the second solid insulating layer is further covered with a semi-conductive layer.

8. The transformer according to claim 1, wherein the first solid insulating layer and the second solid insulating layer both are of silicone rubber, polyethylene, polyurethane, polytetrafluoroethylene, polyvinyl chloride, polypropylene or ethylene-propylene rubber.

9. The transformer according to claim 7, wherein the semi-conductive layer is of a polymer material doped with carbon black.

10. The transformer according to claim 9, wherein the polymer material doped with carbon black is ethylene-vinyl acetate copolymer doped with carbon black or polyethylene doped with carbon black, having a resistivity in the range of $10^{-4}$~$10^3$ Ω·m.

* * * * *